July 20, 1926.
P. ARBEIT
1,593,054
FURNACE FOR GLASS MANUFACTURE
Filed Nov. 19, 1924  2 Sheets-Sheet 1
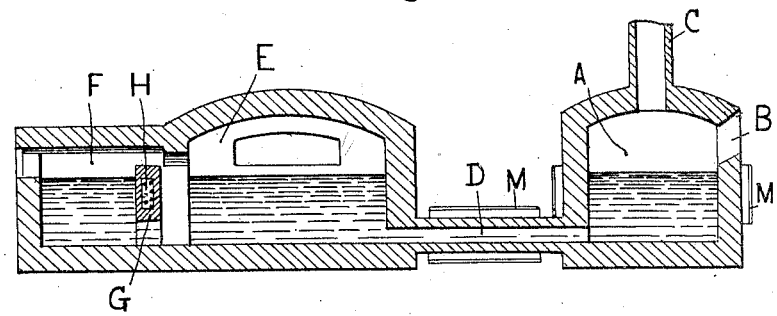
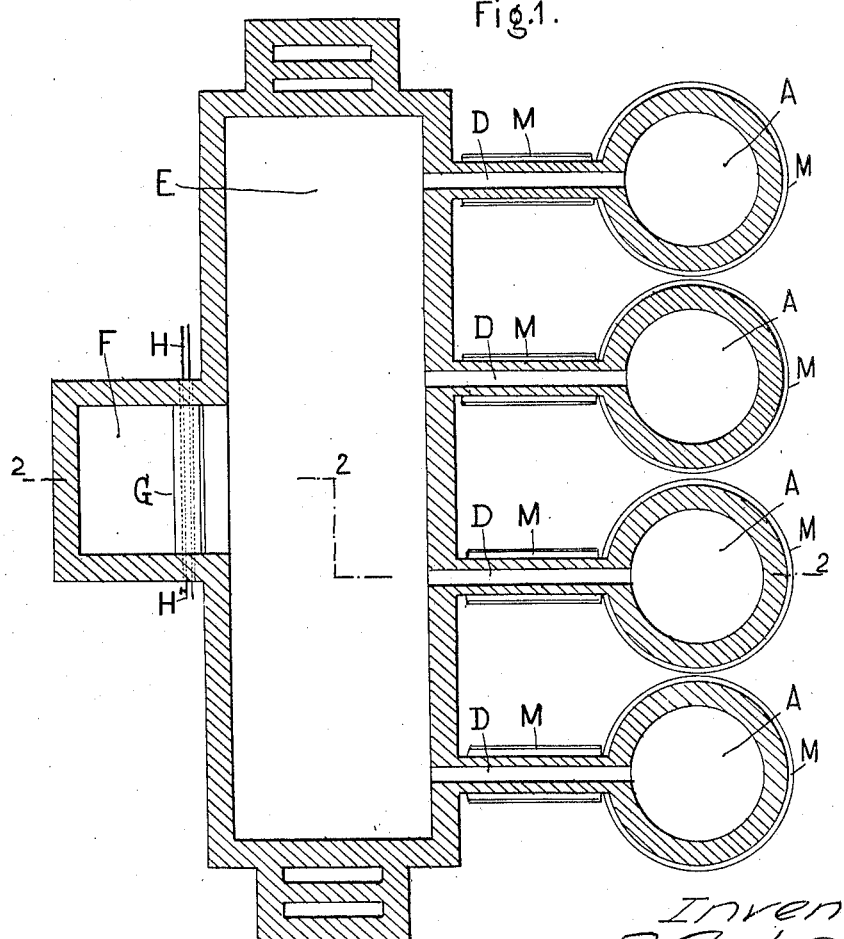

July 20, 1926.

P. ARBEIT 1,593,054

FURNACE FOR GLASS MANUFACTURE

Filed Nov. 19, 1924        2 Sheets-Sheet 2

Inventor
P. Arbeit
by Langner Parry Card & Langner Attys.

Patented July 20, 1926.

1,593,054

UNITED STATES PATENT OFFICE.

PIERRE ARBEIT, OF PARIS, FRANCE, ASSIGNOR TO MANUFACTURES DES GLACES & PRODUITS CHIMIQUES DE ST. GOBAIN, CHAUNY & CIREY, OF PARIS, FRANCE, A CORPORATION OF FRANCE.

FURNACE FOR GLASS MANUFACTURE.

Application filed November 19, 1924, Serial No. 750,909, and in France December 6, 1923.

The present invention relates to continuous glass-making furnaces, of the type in which the vitrifiable composition is first melted, and then refined, in two distinct chambers, which communicate by means of one or more passages or channels. This invention more particularly relates to a glass-making furnace, in which the melting and refining chambers are arranged in separate masonry blocks, and are each provided with separate heating means. In order to render the two operations of melting and refining quite independent one from the other, the melting and refining chambers are connected by one or more passages or channels furnished with electrical heating means, such as resistances, traversed by primary currents, induced currents of medium or high frequency, etc.

It is preferable to provide, in combination, independent melting, refining, and gathering chambers, arranged in separate blocks of masonry, and to connect the melting and refining chambers, on the one hand, and the refining and gathering chambers, on the other hand, by passage means independently heated by electrical means.

The above-mentioned method of electrically heating the passage means connecting the melting, refining, and gathering chambers, allows controlling the temperature of said passage means at any moment and therefore causing a more or less rapid flow of glass therethrough or else to cut off the flow of glass. It is thus possible to vary at will the supply of glass in the passage means and in the refining and gathering chambers. It is also possible to regulate the supply of glass flowing through the refining chamber, regardless of the method of charging resorted to for the melting chamber. As known, the chargings are made from time to time, at fixed intervals, with predetermined quantities, while it is advantageous that the refining operation be gradual and continuous and more particularly so when glass is to be manufactured by continuous mechanical means, by drawing and casting.

The control of the temperature, and therefor of the flow of the glass through said passages, allows preventing parts, which are not completely melted, from passing from the melting chamber to the refining chamber.

The steps of melting, refining, and gathering the glass are hence no longer dependent upon one another.

With several separate melting chambers connected to one and the same refining chamber, it also becomes possible to quickly melt, at temperatures which can be regulated at will and held uniform, vitrifiable matters of which the constituents tend to separate out without reacting upon one another when they are subjected to unequal temperatures, as is the case with melting chambers of large size, where the hot gases do not act in the same uniform manner upon the entire charge.

Moreover, the division of the melting chamber into several separate compartments reduces the risks of the passage of parts, which are not completely melted, into the refining chamber, when the requirements of manufacture call for a larger refining chamber.

This arrangement also allows the combination of several gathering chambers with one and the same refining chamber. It is thus possible to simultaneous gather glass in different gathering tanks, where the requirements of manufacture call for different gathering temperatures, as is well known, for different kinds of glass.

It is obvious there can be provided several refining chambers, with one or more melting chambers, and with one or more gathering chambers, if the vitrifiable matters, treated in the melting chambers, are to be subjected to different refining treatments.

The annexed drawings represent by way of examples different methods of carrying out the present invention.

Figure 1 is a view in horizontal section and

Figure 2 is a view in vertical section, along the broken line 2—2—2 of Figure 1, of a form of construction with electrical heating of the melting furnaces and of the passages connecting the latter to the fining tank, which is heated by gas or oil burners.

Figure 4:
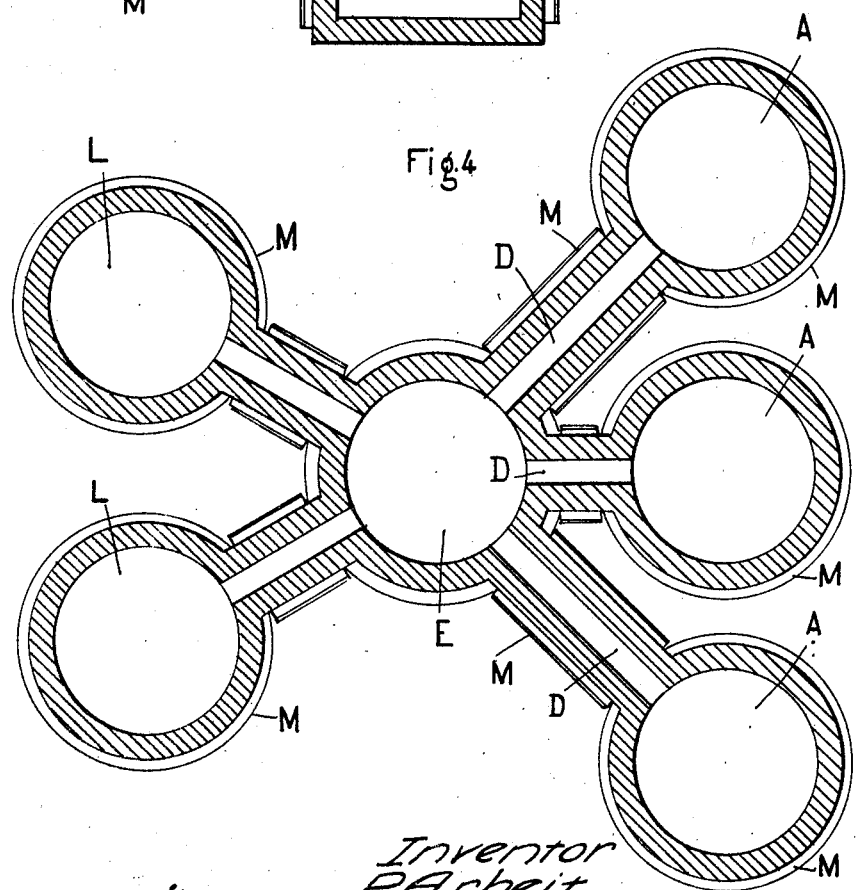

Figure 4 a view in horizontal section of a form of construction in which the melting tanks, the passages connecting the latter to the fining tank, and this tank itself, are heated electrically.

In Figures 1 and 2, the melting zone is constituted by chambers A of any number and shape provided with charging holes B and draught apertures C connected to one or more flues. Passages D connect these chambers to a tank E in which the fining takes place. The glass after fining enters the gathering tank F from which it is separated as usual, for example by a barrier G cooled by water-circulation H.

The chambers A and the passages D are heated by electrical heating methods, for example by resistances traversed by primary currents, by induction by currents of medium or high frequency or by any other means; these means of electrical heating are represented in a diagrammatic manner by sleeves M. The chamber E on the contrary, is heated by ordinary methods.

Figure 3:
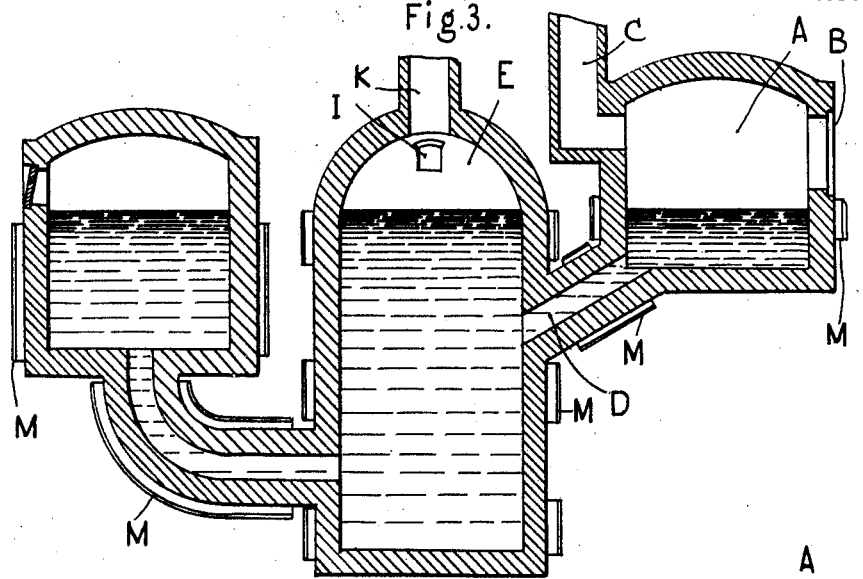
Figure 3 is a view in vertical section.

In Figures 3 and 4, the fining zone E is itself heated electrically. Peep-holes I allow of following the progress of the fining; a pipe, which enters at K above the surface of the bath of glass permits producing a partial vacuum for ensuring thereby the evolution of bubbles of gas which form in the glass in the course of the fining.

The chamber E is connected to the gathering tanks L by passages, which are heated, as are the gathering tanks themselves, by electrical heating means, as shown conventionally at M.

What I claim is:

1. In a continuously operating glass-making furnace, in combination, independent melting and refining chambers arranged in separate blocks of masonry, means for separately heating the melting and refining chambers, passage means connecting the melting and refining chambers, and electrical means for independently heating the passage means and controlling the flow of glass therethrough, for the purpose described.

2. In a continuously operating glass-making furnace, in combination, independent melting, refining and gathering chambers, arranged in separate blocks of masonry, means for separately heating the melting, refining and gathering chambers, passage means connecting, on the one hand, the melting and refining chambers, and, on the other hand, the refining and gathering chambers, and electrical means for independently heating the passage means and controlling the flow of glass therethrough, for the purpose described.

3. In a continuously operating glass-making furnace, in combination, a plurality of independent melting chambers, a refining chamber completely independent from the melting chambers, the melting and refining chambers being arranged in separate blocks of masonry, means for separately heating the melting and refining chambers, passage means connecting the melting and refining chambers, and electrical means for independently heating the passage means and controlling the flow of glass therethrough, for the purpose described.

4. In a continuously operating glass-making furnace, in combination, independent melting and refining chambers and a plurality of independent gathering chambers, the melting, refining, and gathering chambers being arranged in separate blocks of masonry and completely independent each from the others, means for separately heating the melting, refining and gathering chambers, passage means conecting, on the one hand, the melting and refining chambers, and, on the other hand, the refining and gathering chambers, and electrical means for independently heating the passage means and controlling the flow of glass therethrough, for the purpose described.

In testimony whereof I have signed my name to this specification.

PIERRE ARBEIT.